(12) United States Patent
Dallies et al.

(10) Patent No.: US 7,276,282 B2
(45) Date of Patent: Oct. 2, 2007

(54) REINFORCING THREADS AND COMPOSITES RESISTANT TO CORROSIVE MEDIA

(75) Inventors: Eric Dallies, La Ravoire (FR); Patrick Moireau, Curienne (FR)

(73) Assignee: Saint-Gobain Vetrotex France S.A., Chambery (FR)

( * ) Notice: Subject to any disclaimer, the term of this patent is extended or adjusted under 35 U.S.C. 154(b) by 169 days.

(21) Appl. No.: 10/506,674

(22) PCT Filed: Mar. 26, 2003

(86) PCT No.: PCT/FR03/00950

§ 371 (c)(1),
(2), (4) Date: Sep. 17, 2004

(87) PCT Pub. No.: WO03/082762

PCT Pub. Date: Oct. 9, 2003

(65) Prior Publication Data

US 2005/0147816 A1  Jul. 7, 2005

(30) Foreign Application Priority Data

Mar. 29, 2002 (FR) .................................. 02 04047

(51) Int. Cl.
*B32B 9/00* (2006.01)
*C08K 9/06* (2006.01)

(52) U.S. Cl. ...................... 428/391; 428/375; 428/378; 428/392; 252/8.81; 252/8.83; 523/214; 523/216; 523/217

(58) Field of Classification Search ............... 428/392, 428/391, 378, 375; 523/214, 216, 277; 252/8.81, 252/8.83

See application file for complete search history.

(56) References Cited

U.S. PATENT DOCUMENTS 3,350,345 A   10/1967   Clayton et al.
3,823,103 A   7/1974    Harding
4,247,436 A   1/1981    Roedder et al.
4,524,000 A   6/1985    Dixon et al.
5,109,057 A   4/1992    Ito et al.
5,736,246 A * 4/1998    Augier et al. ............... 428/392

FOREIGN PATENT DOCUMENTS

FR   2 178 704    11/1973
WO   01 90017     11/2001

* cited by examiner

*Primary Examiner*—Jill Gray
(74) *Attorney, Agent, or Firm*—Oblon, Spivak, McClelland, Maier & Neustadt, P.C.

(57) ABSTRACT

The present invention relates to reinforcement yarns coated with a sizing composition comprising at least one silane satisfying the formula:

$$Si(R^1)(R^2)(R^3)(R^4)$$

in which:

$R^1$, $R^2$ and $R^3$ are chosen from the following atoms or groups:
—H (except in the case of $R^3$), —Cl, —O—$R^5$, —O—$R^6$—O—$R^5$, —O—(C=O)—$R^5$, —O—$R^6$—(C=O)—$R^5$, $R^5$ and $R^6$ being chosen from hydrocarbon radicals whose main chain has from 1 to 4 carbon atoms;

$R^4$=—$R^7$—$NHR^8$ $R^7$ being chosen from branched hydrocarbon radicals whose main chain has from 2 to 6 carbon atoms, $R^8$ being chosen from the following groups:
—H, —$R^9$—$NH_2$, —$R^{10}$—NH—$R^9$—$NH_2$, $R^9$ being chosen from hydrocarbon radicals containing 1 to 12 carbon atoms or from carbonyls, and $R^{10}$ being chosen from hydrocarbon radicals whose main chain has from 1 to 6 carbon atoms.

The glass yarns according to the invention are particularly suitable for reinforcing organic materials, the yarns and composites obtained resisting in a corrosive medium.

11 Claims, No Drawings

REINFORCING THREADS AND COMPOSITES RESISTANT TO CORROSIVE MEDIA

The present invention relates to yarns (or fibers) capable of reinforcing organic and/or inorganic materials and to the reinforced products (or composites) obtained, these reinforcement yarns and these composites being able to be used in a corrosive medium (wet medium, acid medium or basic medium).

The present invention relates in particular to glass reinforcement yarns that can be obtained by mechanically drawing, at high speed (up to several tens of meters per second), molten glass strands flowing out of orifices made in the base of a bushing (or die). These strands are drawn into the form of filaments, which are coated, before they are assembled into yarns, with a composition called a sizing composition intended in particular to protect the yarns from abrasion and to promote adhesion between the glass and the material to be reinforced.

The most common glass reinforcement yarns are based on E-glass, the composition of this glass being derived from the 1 170° C. eutectic of the $SiO_2$—$Al_2O_3$—$CaO$ ternary diagram (cf. patents U.S. Pat. No. 2,334,961 and U.S. Pat. No. 2,571,074 which present the archetype of these glasses). In most cases, these E-glass yarns, coated with conventional sizes, are suitable for reinforcing organic materials and make it possible to produce composites with good mechanical properties. However, when these yarns or the composites produced from these yarns are used in corrosive—wet, acid or basic—media over a long time and/or under high stresses (for example yarns used to reinforce cement or composites in prolonged contact with an acid), an appreciable reduction in the mechanical properties of the composites formed is observed over the course of time.

There are also AR (alkali-resistant) glass yarns which, when also coated with conventional sizing compositions, make it possible to obtain composites more able to attain good mechanical properties over time in acid medium and above all in basic medium (whether this medium is formed by the material to be reinforced or is that in which the composites are used). The composition of these glasses generally contains a high proportion of zirconium oxide and is, for example, of the $Na_2O$—$ZrO_2$—$SiO_2$ type. A conventional composition of these glasses is given for example in patent GB 1 290 528. However, these yarns remain sensitive to wet medium, such yarns furthermore adhering less strongly to organic materials than E-glass yarns and thus limiting their use to the direct reinforcement (without an intermediate organic material) of inorganic materials such as cement.

The objective of the present invention was to develop composites more resistant in a corrosion medium, preferably in various corrosive media and in particular in a wet medium (the most common corrosive medium, moisture already being present in the ambient air) and/or to broaden the range of products that can be used in such media, in particular in fields for which the abovementioned glass yarns are not the most suitable or for which the products currently used are not entirely satisfactory, for example in the field of manufacturing hollow bodies by filament winding, in particular for storing or transporting various chemicals, or in the field of pultrusion (for example with a view to replacing conventional concrete rebars with composite products).

This objective is achieved by the present invention by providing reinforcement yarns allowing composites to be obtained with mechanical properties that are better in at least one corrosive medium (advantageously a wet medium) than each of the aforementioned respective existing yarns, the yarns according to the invention also allowing the manufacture of high-performance composites suitable for the abovementioned applications.

The reinforcement yarns according to the invention (preferably glass yarns) are coated with a sizing composition comprising (or one of the initial constituents of which is) at least one silane satisfying the following formula:

$$Si(R^1)(R^2)(R^3)(R^4)$$

in which:

$R^1$ and $R^2$ are chosen from the following atoms or groups: —H, —Cl, —O—$R^5$, —O—$R^6$—O—$R^5$, —O—(C=O)—$R^5$, —O—$R^6$—(C=O)—$R^5$;

$R^3$ is chosen from the following atoms or groups: —Cl, —O—$R^5$, —O—$R^6$—O—$R^5$, —O—(C=O)—$R^5$, —O—$R^6$—(C=O)—$R^5$;

$R^5$ and $R^6$ being chosen from hydrocarbon radicals whose main chain has from 1 to 4 carbon atoms;

$R^4$=—$R^7$—$NHR^8$;

$R^7$ being chosen from branched hydrocarbon radicals whose main chain has from 2 to 6 carbon atoms;

$R^8$ being chosen from the following groups:
—H, —$R^9$—$NH_2$, —$R^{10}$—NH—$R^9$—$NH_2$;

$R^9$ being chosen from hydrocarbon radicals containing from 1 to 12 carbon atoms or from carbonyls; and $R^{10}$ being chosen from hydrocarbon radicals whose main chain has from 1 to 6 carbon atoms.

The term "hydrocarbon radical" is understood to be advantageously a radical (or group) formed solely from carbon and hydrocarbon atoms, said radical being branched or unbranched and being derived (removal, in the case of a monovalent radical, of one hydrogen atom of a hydrocarbon or, in the case of a divalent radical, removal of two hydrogen atoms from a hydrocarbon) from a saturated hydrocarbon or hydrocarbon possibly having one or more multiple bonds (double bond, triple bond), and being acyclic or possibly cyclic or even, in the case of $R^9$, able to include a benzene ring. In the case of a branched hydrocarbon group, the secondary chain or chains each advantageously have from 1 to 4 carbon atoms.

The $R^1$, $R^2$ and $R^3$ groups may be identical or different. Likewise, $R^5$ and $R^6$ may be derived from identical or different hydrocarbons. Preferably, $R^1$ is chosen from the following atoms or groups: —H, —$OR^5$ (alkoxy group), —O—$R^6$—O—$R^5$, —O—(C=O)—$R^5$ (acetoxy group) and $R^2$ and $R^3$ are chosen from the following groups: —$OR^5$, —O—$R^6$—O—$R^5$, —O—(C=O)—$R^5$. Also preferably, $R^5$ and $R^6$ are chosen respectively from alkyl radicals and alkylidene radicals containing from 1 to 3 carbon atoms. More particularly preferably, $R^1$, $R^2$ and $R^3$ are chosen from alkoxy groups (in particular from methoxy, ethoxy and propoxy groups).

The radical $R^7$ is branched (or substituted) with one or more side chains (or groups or radicals) formed solely from carbon and hydrogen atoms, each of these side chains comprising from 1 to 4 carbon atoms, which may be linear (for example in the form of a linear alkyl such as a methyl or ethyl) or in the form of a branched chain (for example an isopropyl) and may possibly be able to have multiple bonds (for example an alkylenyl). Preferably, the $R^7$ radical is derived from a saturated hydrocarbon and is acyclic. Also advantageously, the $R^7$ radical is preferably branched by alkyl groups, in particular branched by at least two side chains, which may or may not be carried by the same carbon of the main chain (and particularly preferably by one or more of the carbons in the middle, or the more at the center, of the main chain comprising at least three carbon atoms), the side chains being chosen from alkyls containing from 1 to 3 carbon atoms.

The $R^9$ radical is preferably chosen from the following (divalent) radicals: a branched or unbranched, cyclic or acyclic, alkylidene radical, the main chain of which has from 1 to 6 carbon atoms, a phenyl radical, an alkylphenyl radical combining the above two radicals types or possibly an alkenylphenyl, and a carbonyl radical —(C=O)—. The $R^{10}$ radical is preferably an alkylidene radical.

Advantageously, the $R^8$ radical is chosen from the following atoms or groups —H, —$R^9$—$NH_2$.

One particularly advantageous silane satisfying the definition of the invention is that in which $R^1$=$R^2$=$R^3$=—$CH_3O$ and in which $R^4$=—$CH_2$—$CH_2$—$C(CH_3)_2$—$CH_2$—$NH_2$ (i.e. $R^7$=—$CH_2$—$CH_2$—$C(CH_3)_2$—$CH_2$— and $R^8$=—H), i.e. amino-4-dimethyl-3,3-butyltrimethoxysilane or else possibly that in which $R^1$=$R^2$=$R^3$=—$CH_3O$ and $R^4$=—$CH_2$—$C(CH_3)_2$—$CH_2$—$NH_2$ (i.e. $R^7$=—$CH_2$—$C(CH_3)_2$—$CH_2$— and $R^8$=—H), i.e. amino-3-dimethyl-2,2-propyltrimethoxysilane.

The present invention also relates to the sizing composition used to coat the yarns, this composition comprising at least one silane satisfying the formula defined above.

The use of the composition defined according to the invention to coat yarns intended to be used as reinforcements in a corrosive medium has resulted in an improvement, either initially or over time (smaller reduction in a property for a given time), in at least one given (wet, acid or basic) medium, in particular in at least a wet medium, of at least one mechanical property of the composites formed from the yarns thus coated compared with the composites formed from yarns of the same base composition (for example the same glass composition) but coated with conventional sizing compositions. Furthermore, it has been observed that the yarns according to the invention are capable of reinforcing both organic materials and inorganic materials and that this is so whatever the base composition of these yarns (particularly when these yarns are AR glass yarns). These yarns are consequently suitable for being used in new fields of application and, if appropriate, in a broad range of corrosive media (in particular at least a wet medium), the observed improvement depending on the type of glass yarn coated, on the material reinforced and on the corrosive medium in question.

As indicated above, the yarns according to the invention are preferably glass yarns, these yarns generally being prepared using processes known per se. In general, the glass yarns according to the invention are manufactured in the following manner: molten glass strands are mechanically drawn (at speeds of several tens of meters per second) into the form of one or more sheets of continuous filaments from the orifices of one or more bushings (or dies), and then the filaments (generally having a diameter between 5 and 24 μm) are coated with the sizing composition according to the invention before being assembled into one or more yarns. These yarns may then be wound onto rotating supports, distributed on moving conveyors, in order to form mats or veils, or else chopped, either after formation by the unit used to draw them, or in a subsequent operation. Where appropriate, the yarns may, before or after being collected, be subjected to a heat treatment so as, for example, to dry them and/or to cure them.

Preferably, the yarns according to the invention are collected in the form of windings (for example rovings or cakes). In particular when the yarns according to the invention are AR glass yarns, these windings may advantageously be used for the manufacture of hollow bodies (such as pipes and tanks) by filament winding (deposition of a reinforcement, for example a sheet of rovings, impregnated with an organic material on a mandrel rotated about its axis), it being possible for these hollow bodies to transport or store chemicals, or these packages may be used for the manufacture of composite profiles by pultrusion (passage of a reinforcement impregnated with an organic material through a heated die), these profiles being used, for example, in the manufacture of reinforcements for reinforced concrete. The present invention has thus allowed novel products to be developed, such as composite reinforcements or bars based on AR glass yarns according to the invention that can advantageously replace conventional concrete rebars.

The glass yarns according to the invention may be obtained from any type of glass normally used for producing glass reinforcement yarns. The yarns according to the invention may especially be E-glass yarns, "R" (mechanically strong)-type glass yarns or "S"-type glass yarns based on silica, alumina, magnesium and optionally lime, alkali-resistant glass yarns, yarns based on compositions containing no boron, etc.

Preferably, the glass yarns according to the invention are yarns of "alkali-resistant" (AR) glass, this glass generally containing zirconium oxide $ZrO_2$. These yarns may be chosen from any existing alkali-resistant glass yarns (such as those described in patents GB 1 290 528, U.S. Pat. No. 4,345,037, U.S. Pat. No. 4,036,654, U.S. Pat. No. 4,014,705, U.S. Pat. No. 3,859,106, etc.) and preferably contain at least 5 mol % $ZrO_2$. According to one embodiment of the invention, the constituent glass of the yarns comprises $SiO_2$, $ZrO_2$ and at least one alkali metal oxide, preferably $Na_2O$, as principal constituents.

One alkali-resistant glass composition particularly used for producing the glass yarns according to the invention is the composition described in patent GB 1 290 528, composed mainly of the following components in the proportions expressed as molar percentages: 62-75% $SiO_2$; 7-11% $ZrO_2$; 13-23% $R_2O$; 1-10% R'O; 0-4% $Al_2O_3$; 0-6% $B_2O_3$; 0-5% $Fe_2O_3$; 0-2% $CaF_2$; 0-4% $TiO_2$; $R_2O$ representing one or more alkali metal oxides, preferably $Na_2O$, and optionally (up to 2%) $Li_2O$, and R'O being one or more components chosen from alkaline-earth oxides, ZnO and MnO.

Particularly advantageously, the alkali-resistant glass yarns as defined according to the invention meet the objectives of the invention—in particular they make it possible to obtain composites having good mechanical properties in a corrosive medium, whether in a wet, acid or basic medium (broad range of possible applications, particularly use in applications in which the corrosive medium is liable to change), the improvement being observed especially in a wet medium, over time and possibly initially. In addition, the AR glass yarns according to the invention combine particularly satisfactorily with organic materials (and not just with inorganic materials), making it possible to obtain novel composite products based on AR glass and organic material (s), such as those mentioned above, these novel products also being covered by the present invention.

The sizing composition coating the yarns according to the invention may be an aqueous or anhydrous composition or it may contain, for example, less than 5% by weight of compounds acting solely as a solvent. In most cases, the composition according to the invention is an aqueous composition containing between 85 and 98% water by weight and being in the form of an aqueous dispersion (emulsion, suspension, emulsion mixture and/or suspension mixture) or of a solution.

If the sizing composition according to the invention is in the form of an aqueous dispersion or solution, the solids content of the composition is generally between 2 and 15% by weight of the composition.

According to the definition of the invention, the composition comprises a particular silane satisfying the formula given above, this silane acting not only as a coupling agent, as usually observed with silanes, but also acting, it would seem, as a protective agent. For this purpose and so as to distinguish it from the usual silanes acting only as coupling agents, the silane satisfying the abovementioned formula is hereafter denoted by the term "protection agent". It seems in particular (without however being limited to this supposition) that said silane has the double advantage of protecting the surface of the reinforcement yarns, particularly from moisture, without correspondingly impairing, in particular, impregnation with organic materials.

It is possible to use one or more protection agents according to the invention. Preferably, the composition comprises a single protection agent according to the invention.

The content of protection agent(s) according to the invention within the sizing composition is generally between 1 and 20% by weight, preferably between 3 and 15% by weight, of the solids content of the composition, the improvement in the mechanical properties observed on the composites generally increasing with this content. Below 1% by weight of protection agent(s) according to the invention, the improvement in the mechanical properties is insignificant, while above 20% by weight of protection agent(s) according to the invention the cost of the size becomes very high without any further improvement in the properties.

Apart from this or these protection agents, the sizing composition according to the invention may comprise one or more other silanes acting as coupling agents, especially one or more silanes commonly used in sizes, such as an amino silane, a vinyl silane, γ-methacryloxypropyltrimethoxysilane, etc. The content of this or these other silanes is generally less than 10% by weight of the solids content of the composition according to the invention, the maximum content of silane(s), all silanes included, not exceeding 30% by weight of the solids content of the composition according to the invention. Preferably, when the yarns according to the invention are intended for reinforcing at least one vinyl ester material (or possibly a polyester or epoxy material), the composition comprises, in addition to the abovementioned protection agent(s), at least one γ-methacryloxypropyltrimethoxysilane or possibly a vinyl silane. The sizing composition may also comprise other coupling agents such as titanates, zirconates, etc. or organic compounds promoting the coupling between the glass yarns and certain organic materials.

The protection agent or agents may be added directly to an existing sizing composition, for example to any sizing composition normally used in the intended application, or the sizing composition according to the invention may be obtained by mixing all the required components in one or more steps. In general, the silane according to the invention is added to the composition in hydrolyzed form. Other components, such as those normally used in this type of composition, may also be present in the sizing composition according to the invention.

In particular, the composition according to the invention generally comprises, in addition to the silane(s), at least one bonding (or film-forming) agent, this agent having an effect on the processability of the yarn, for example ensuring the linking-together (integrity) of the filaments within the yarns and thus making them easier to be handled and/or allowing better impregnation of the yarns by the matrices to be reinforced. This agent, well known in the sizing field, is usually present in the form of a compound having one or more epoxy functional groups, for example an epoxy of bisphenol A or F, a novolac epoxy, etc. and/or in the form of a compound having one or more polyester functional groups, such as an unsaturated polyester, and/or an epoxy ester, etc. In general, the sizing composition according to the invention comprises at least two bonding agents, one in particular allowing good sheathing of the yarns and the other ensuring good impregnation by the matrix to be reinforced. The content of bonding agent(s) is generally less than 90% by weight of the solids content of the composition and is preferably between 50 and 85% by weight of the solids content of the composition.

Likewise, the composition generally comprises at least one lubricating agent, this agent protecting the yarns from abrasion during and after the fiberizing. This agent, well known in the sizing field, is usually in the form of a mixture of alkyls, alkyl benzenes, fatty esters, fatty alcohols, surfactants, etc. In general, the sizing composition according to the invention comprises at least two lubricating agents, such as a mineral oil and a fatty acid ester for example, one of them allowing lubrication of the yarns in a wet medium at the moment of fiberizing and the other allowing subsequent lubrication in a dry medium. The content of lubricating agent(s) is generally less than 20% by weight of the solids content of the composition and is preferably between 5 and 15% by weight of the solids content of the composition.

The composition according to the invention may also comprise other active components, especially components commonly used in sizing compositions, such as textile (or softening) agents, antistatic agents, emulsifiers or surfactants, wetting agents, etc., the proportion of these other agents generally ranging from 0 to 15% by weight of the solids content of the composition.

Apart from the aforementioned active components, the composition may also comprise at least one solvent, especially water, as mentioned above. Certain active components may be already in solution or dispersed in a solvent while they are being added to the mixture that has to give the sizing composition according to the invention and/or the solvent or solvents may be added to the mixture with or after the active components so as to obtain the viscosity and the proportions that are usually required for depositing the composition on the filaments.

The composition is generally deposited in one step on the filaments before they are assembled into yarns, as explained above. However, the components of the composition coating the yarns may be deposited in several steps; for example, the silane defined according to the invention may be deposited, in hydrolyzed form, independently of the other constituents of the composition, preferably before these other constituents are deposited, so that the silane is brought into direct contact with the constituent glass of the yarn.

The loss on ignition of the yarns according to the invention is generally between 0.3 and 2% by weight of the yarns and preferably between 0.5 and 1.5% by weight of the yarns.

The composites obtained from the yarns according to the invention comprise at least one organic material and/or at least one inorganic material, and reinforcement yarns, at least some of the reinforcement yarns being the yarns according to the invention. The reinforcement yarns according to the invention are preferably combined with thermosetting material (vinyl esters, polyesters, phenolics, epoxides, acrylics, etc.), advantageously with vinyl esters, these being more corrosion-resistant than other organic materials, and/or with cementous material (cement, concrete, mortar, gypsum, compounds formed by reaction between lime, silica and water, etc.), it being possible for the reinforcement of the cementous materials to be carried out directly or indirectly (after being combined with an organic material). Particularly useful composites according to the invention are the composites formed from at least one plastic (advantageously organic) material and from reinforcement yarns according to the invention.

The following nonlimiting examples illustrate the glass yarns and the compositions according to the invention and make it possible to compare the mechanical properties obtained, before and after aging, on composites produced from glass yarns according to the invention with the mechanical properties obtained on composites produced from conventional glass yarns.

EXAMPLE 1

In this example, glass filaments 17 μm in diameter were obtained by drawing strands of molten glass, this glass being an AR glass having the following composition expressed in percentages by weight:

| | |
|---|---|
| $SiO_2$ | 61.6% |
| $Al_2O_3$ | 0.9% |
| $ZrO_2$ | 16.8% |
| CaO | 5.4% |
| $Na_2O$ | 14.7% |
| $K_2O$ | 0.3% |
| $Fe_2O_3$ | 0.05% |
| Fluorine | 0.26% |
| $SO_3$ | 0.05% |
| $TiO_2$ | 0.1%. |

These filaments were coated, during their passage before they are assembled into yarns, with the following sizing composition expressed in percentages by weight:

| | |
|---|---|
| 1 100 molecular mass epoxy ester[1] | 1.2% |
| biphenol A epoxy[2] | 3.6% |
| γ-methacryloxypropyltrimethoxysilane coupling agent[3] | 0.35% |
| mineral oil[4] | 0.32% |
| fatty acid ester[5] | 0.54% |
| aminodimethylbutyltrimethoxysilane[6] (silane/protection agent according to the invention) | 0.35% |
| water | 93.64% |

[1]Sold, diluted to 40%, under the reference NEOXIL 962 D by DSM;
[2]Sold, diluted to 60%, under the reference EPIREZ 3510W60 by Resolution;
[3]Sold under the reference SILQUEST A 174 by Osi Specialities;
[4]Sold under the reference TORFIL LA4 by Lamberti;
[5]Sold under the reference SYNTOFIL by Lamberti;
[6]Sold under the reference Y11637 by Osi Specialities.

The filaments were combined into yarns, which were wound in the form of rovings, and then the rovings were heated at 130° C. for 12 hours, so as in particular to dry them. The yarns obtained had a linear density of 545 tex and a loss on ignition of 1.1%.

The yarns were then extracted from the windings in order to measure their tensile breaking tenacity under the conditions defined by the ISO 3341 standard. The tensile breaking tenacity measured on 8 to 10 test samples was about 36 g/tex (standard deviation of 2 g/tex).

The abrasion resistance of the yarns was also determined by weighing the amount of fuzz formed after passing the yarns over a series of rods. For the various yarns coated with the cured size described in the present example, the amount of fuzz after the test was around 28 mg per kg of yarns tested.

Composite plaques with parallel yarns were also produced in accordance with the NF T 57-152 standard from the yarns obtained. The reinforced resin was a vinyl ester resin sold under the reference DERAKANE 411/45 by Dow Chemical, to which were added, per 100 parts by weight of vinyl ester resin, 1.5 parts of a hardener sold under the reference TRIGONOX 239 by Akzo, 0.08 parts of a cure accelerator sold under the reference NL 51P by Akzo, 0.2 parts of a cure accelerator sold under the reference NL-63-100 by Akzo and 0.1 parts of an inhibitor sold under the reference PROMOTER C by Akzo.

The plaques produced were then heat treated and the mechanical properties exhibited by these plaques, in flexure and in shear, were measured, according to the ISO 14125 and ISO 14130 standards respectively, on the test specimens left beforehand for 72 h at 21° C. (with 50% ambient relative humidity). The tensile flexural strength, for a glass content brought back (normalized) to 100%, was about 2 320 MPa (standard deviation 80 MPa) in the case of ten test specimens and the shear strength was about 70 MPa (standard deviation 0.4 MPa).

The mechanical properties of the test specimens were also measured after aging, consisting in putting the test specimens in a glass of boiling water for 72 h and then testing them five hours later. The flexural strength after aging, for a glass content brought back to 100%, was about 1 800 MPa (standard deviation 120 MPa) and the shear strength was about 52 MPa (standard deviation 1.3 MPa).

COMPARATIVE EXAMPLE 1

This example was produced as in Example 1 but with the silane according to the invention replaced, in the sizing composition, by (N-benzylaminoethyl)aminopropyl-trimethoxysilane sold under the reference A1128 by Osi Specialities.

The yarns obtained had a linear density of 623 tex and a loss on ignition of 1%.

The tensile breaking tenacity was about 38 g/tex (standard deviation 3 g/tex).

The amount of fuzz after the abrasion resistance test on the yarns was around 19 mg per kg of yarn tested.

Before aging, the flexural strength, for a glass content brought back to 100%, was about 2350 MPa (standard deviation 80 MPa) and the shear strength was about 52 MPa (standard deviation 2.2 MPa) and, after aging, the flexural strength, for a glass content brought back to 100%, was about 1007 MPa (standard deviation 34 MPa) and the shear strength was about 20 MPa (standard deviation 0.3 MPa).

COMPARATIVE EXAMPLE 2

This example was produced as in Example 1 but with the silane according to the invention replaced, in the sizing composition, by aminoethylaminopropyl-trimethoxysilane sold under the reference Z6020 by Dow Corning.

The yarns obtained had a linear density of 654 tex and a loss on ignition of 0.9%.

The tensile breaking tenacity was about 35 g/tex (standard deviation 3 g/tex).

The amount of fuzz after the abrasion resistance test on the yarns was around 34 mg per kg of yarn tested.

Before aging, the flexural strength, for a glass content brought back to 100%, was about 2380 MPa (standard deviation 50 MPa) and the shear strength was about 54 MPa (standard deviation 1.3 MPa) and, after aging, the flexural strength, for a glass content normalized to 100%, was about 1130 MPa (standard deviation 41 MPa) and the shear strength was about 23 MPa (standard deviation 0.7 MPa).

It may be seen that the yarns according to the invention make it possible to obtain composites having mechanical properties after aging in a wet medium that are substantially improved over those of the composites obtained from conventional yarns presented as comparative examples, the presence of the protection agent furthermore not impairing the other properties of the yarns, for example the windability or the weavability of the yarns. It should be noted that the results after aging in an acid medium or after aging in a basic medium (these results are not reported, differing little between the present examples) are also very satisfactory.

The yarns according to the invention may be used to produce various composites and especially pipes, hoses and tanks by winding or to produce pultruded rods that can be used to replace concrete rebars, etc.

The invention claimed is:

1. A reinforcement yarn coated with a sizing composition comprising at least one silane satisfying the following formula:

$$Si(R^1)(R^2)(R^3)(R^4)$$

wherein:
- $R^1$ and $R^2$ are identical or different, and are selected from the group consisting of:
  —H, —Cl, —O—$R^5$, —O—$R^6$—O—$R^5$, —O—(C=O)—$R^5$, and —O—$R^6$—(C=O)—$R^5$;
- $R^3$ is selected from the group consisting of:
  Cl, —O—$R^5$, —O—$R^6$—O—$R^5$, —O—(C=O)—$R^5$, and —O—$R^6$—(C=O)—$R^5$;
- $R^5$ and $R^6$ are derived from identical or different hydrocarbons, and are selected from hydrocarbon radicals having from 1 to 4 carbon atoms in the main chain;
- $R^4$=—$R^7$—NH$R^8$;
- $R^7$ is selected from branched hydrocarbon radicals having from 2 to 6 carbon atoms in the main chain;
- $R^8$ is selected from the group consisting of:
  —H, —$R^9$—NH$_2$, and —$R^{10}$—NH—$R^9$—NH$_2$;
- $R^9$ is selected from hydrocarbon radicals comprising from 1 to 12 carbon atoms or from carbonyls; and
- $R^{10}$ is selected from hydrocarbon radicals having from 1 to 6 carbon atoms in the main chain.

2. The reinforcement yarn as claimed in claim 1, wherein $R^1=R^2=R^3=$—OCH$_3$, and $R^4=$—CH$_2$—CH$_2$—C(CH$_3$)$_2$—CH$_2$—NH$_2$ or —CH$_2$—C(CH$_3$)$_2$—CH$_2$—NH$_2$.

3. The reinforcement yarn as claimed in claim 1, wherein the composition further comprises at least one of γ-methacryloxy-propyltrimethoxysilane and a vinyl silane.

4. The reinforcement yarn as claimed in claim 1, wherein the composition further comprises at least one bonding agent.

5. The reinforcement yarn as claimed in claim 1, wherein the composition further comprises at least one lubricating agent.

6. The reinforcement yarn as claimed in claim 1, wherein said yarn is obtained from an alkali-resistant glass.

7. The reinforcement yarn as claimed in claim 1, wherein said yarn is capable of reinforcing plastic materials.

8. A composite comprising at least one organic material and/or one inorganic material and the reinforcement yarn as claimed in claim 1 incorporated in said material.

9. The composite as claimed in claim 8, wherein $R^1=R^2=R^3=$—OCH$_3$, and $R^4=$—CH$_2$—CH$_2$—C(CH$_3$)$_2$—CH$_2$—NH$_2$ or —CH$_2$—C(CH$_3$)$_2$—CH$_2$—NH$_2$.

10. A sizing composition for reinforcement yarns, comprising at least one silane satisfying the following formula:

$$Si(R^1)(R^2)(R^3)(R^4)$$

wherein:
- $R^1$ and $R^2$ are identical or different, and are selected from the group consisting of:
  —H, —Cl, —O—$R^5$, —O—$R^6$—O—$R^5$, —O—(C=O)—$R^5$, and —O—$R^6$—(C=O)—$R^5$;
- $R^3$ is selected from the group consisting of:
  Cl, —O—$R^5$, —O—$R^6$—O—$R^5$, —O—(C=O)—$R^5$, and —O—$R^6$—(C=O)—$R^5$;
- $R^5$ and $R^6$ are derived from identical or different hydrocarbons, and are selected from hydrocarbon radicals having from 1 to 4 carbon atoms in the main chain;
- $R^4=$—$R^7$—NH$R^8$;
- $R^7$ is selected from branched hydrocarbon radicals having from 2 to 6 carbon atoms in the main chain;
- $R^8$ is selected from the group consisting of:
  —H, —$R^9$—NH$_2$, and —$R^{10}$—NH—$R^9$—NH$_2$;
- $R^9$ is selected from hydrocarbon radicals comprising from 1 to 12 carbon atoms or from carbonyls; and
- $R^{10}$ is selected from hydrocarbon radicals having from 1 to 6 carbon atoms in the main chain.

11. The sizing composition as claimed in claim 10, wherein $R^1=R^2=R^3=$—OCH$_3$, and $R^4=$—CH$_2$—CH$_2$—C(CH$_3$)$_2$—CH$_2$—NH$_2$ or —CH$_2$—C(CH$_3$)$_2$—CH$_2$—NH$^2$.

* * * * *